Patented Jan. 8, 1952

2,581,384

UNITED STATES PATENT OFFICE 2,581,384

ACYLATED AMINO ALCOHOL QUATERNARY AMMONIUM DERIVATIVES OF ALPHA-HALOGEN CARBOXY ACID ESTERS OF OXYALKYLATED PHENOL-ALDEHYDE RESINS

Melvin De Groote, University City, and Bernhard Keiser, Webster Groves, Mo., assignors to Petrolite Corporation, Ltd., Wilmington, Del., a corporation of Delaware No Drawing. Application December 13, 1948, Serial No. 65,085

8 Claims. (Cl. 260—53)

The present invention is concerned with certain new chemical products, compounds, or compositions which have useful application in various arts. This invention is a continuation-in-part of our co-pending application Serial No. 726,207, filed February 3, 1947, and now abandoned. It includes methods or procedures for manufacturing said new chemical products, compounds, or compositions, as well as the products, compounds or compositions themselves. Said new compounds or compositions are quaternary ammonium compounds obtained by reaction between a basic acylated aminoalcohol in which there is at least one occurrence of the radical $$RCO.(R'O)_{n'}N<$$

in which RCO is a the acyl radical of a monocarboxy detergent-forming acid having at least 8 and not more than 32 carbon atoms; the amino nitrogen atom is basic; R' is an alkylene radical having at least 2 and not more than 10 carbon atoms; and $n'$ is a small whole number varying from 1 to 10; and the molecular weight of said compound in monomeric form being at least 213 and not over 4,000; and the ester of an alpha-halogen monocarboxylic acid having not over 6 carbon atoms and hydrophile hydroxylated synthetic products; said hydrophile synthetic products being oxyalkylation products of (A) An alpha-beta alkylene oxide having not more than 4 carbon atoms and selected from the class consisting of ethylene oxide, propylene oxide, butylene oxide, glycide, and methylglycide; and (B) An oxyalkylation-susceptible, fusible, organic solvent-soluble, water-insoluble, phenol-aldehyde resin; said resin being derived by reaction between a difunctional monohydric phenol and an aldehyde having not over 8 carbon atoms and reactive towards said phenol; said resin being formed in the substantial absence of trifunctional phenols; said phenol being of the formula:

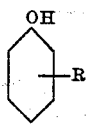

in which R is a hydrocarbon radical having at least 4 and not more than 12 carbon atoms and substituted in the 2,4,6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

Although the herein described products have a number of industrial applications, they are of particular value for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion. This specific application is described and claimed in our co-pending application Serial No. 65,084, filed December 13, 1948, and now Patent No. 2,542,002, granted February 20, 1951. The new products are useful as wetting, detergent and leveling agents in the laundry, textile and dyeing industries; as wetting agents and spreaders in the application of asphalt in road building and the like; as a flotation reagent in the flotation separation of various aqueous suspensions containing negatively charged particles, such as sewage, coal washing waste water, and various trade wastes and the like; as germicides, insecticides; emulsifying agents, as, for example, for cosmetics, spray oils, water-repellent textile finishes; as lubricants, etc.

The phenol-aldehyde resins and their oxyalkylation products, which are converted to the alpha-halogen monocarboxy acid esters used to produce the quaternary ammonium compounds of the present application are described in our Patents 2,499,370, granted March 7, 1950, and 2,542,002, granted February 20, 1951, and the alpha-halogen monocarboxy acid esters are described in this latter patent, and reference is made to these patents for a description of the phenol-aldehyde resins, their oxyalkylation, and their conversion to alpha-halogen monocarboxy acid esters. For specific examples of the resins, reference is made to Examples 1a through 103a of Patent 2,499,370. For examples of oxyalkylated products derived from these resins, reference is made to the tables which appear in columns 31 through 46 of Patent 2,542,002. For examples of the alpha-halogen monocarboxy acid esters of these oxyalkylated resins, reference is made to Examples 1c through 39c of Patent 2,542,002.

To produce the quaternary ammonium compounds of the present invention, an ester of an alpha-halogen low molal fatty acid of the type exemplified by Examples 1c through 39c of Patent 2,542,002 is reacted with an esterified hydroxylated amine of the kind previously referred to, to wit, a basic acylated aminoalcohol in which there is at least one occurrence of the radical

in which RCO is the acyl radical of a monocarboxy detergent-forming acid having at least 8 and not more than 32 carbon atoms; the amino nitrogen atom is basic; R' is an alkylene radical having at least 2 and not more than 10 carbon atoms; and $n'$ is a small whole number varying from 1 to 10; and the molecular weight of said compound in monomeric form being at least 213 and not over 4,000.

If one uses mono-oleyl, monostearyl, monoricinoleyl triethanolamine, i. e., triethanolamine in which a single hydroxyl hydrogen atom has been replaced by the higher acyl radicals HCO, and if one employs a butylphenol resin and chloroacetic acid as the alpha-halogen acid to yield the ester, then and in that event, the esters containing a labile chlorine atom combine readily with tertiary amino compounds, as herein specified, to yield quaternary compounds. The usual method is to heat the reaction mass at 135° to 165° C. for approximately 2 to 8 hours. Often the reaction is complete within as little as one-half an hour and may be completed at even lower temperatures. The reaction involved, ignoring side reactions, may be illustrated as follows:

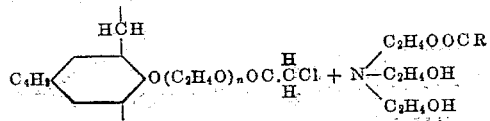

$n$ varies from 1 to 30
R = aliphatic hydrocarbon radical having 7 to 21 carbon atoms where RCO is the acyl radical of a monocarboxy acid having 8 to 22 carbon atoms.

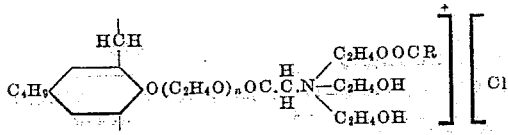

As will be pointed out subsequently, the acylated tertiary amine may have two or more basic amino nitrogen atoms and two or more acyl radicals. In other words, such polyamine would be polyfunctional towards the halogenated acid ester, and thus could combine with more than 1 mole of halogentaed acid ester.

Previous reference has been made to the acylated tertiary amines by general reference and by specific example.

The class of reagents which are employed as reactants to combine with the aliphatic halogenated carboxy acid ester, consists of acylated amino alcohols, in which an acyloxy radical derived from a detergent-forming acid having from 8 to 22 carbon atoms is joined to a basic nitrogen atom by a carbon atom chain, or a carbon atom chain which is interrupted at least once by an oxygen atom. The aminoalcohols may have more than one amino radical, or, for that matter, more than one basic amino radical. The compounds herein contemplated as reactants are well known compounds and are produced by conventional procedures. Stated another way, the compounds herein contemplated as reactants are esters of aminoalcohols which may contain ether linkages, as well as more than one amino nitrogen atom.

As has been previously stated, the amino compounds herein contemplated for employment as reactants in preparing the new compositions of matter or new compounds in the present process, are old and well known products. For convenience, and for purpose of brevity, reference is made to the following three United States patents, to De Groote and Keiser, to wit, Nos. 2,324,488, 2,324,489, and 2,324,490, all dated July 20, 1943. Said patents are concerned with processes for breaking water-in-oil emulsions. The demulsifying agent employed in each instance is the resultant derived by reaction between a certain fractional ester and an acylated aminoalcohol. The aminoalcohols described collectively in the aforementioned three patents are used as reactants for combining with a fractional acidic ester. Thus, said aminoalcohols must have present an alcoholiform hydroxyl as part of an acyl radical, or as part of a substituent for an amino hydrogen atom. In the instant case, such aminoalcohols are not employed as reactants, except as to salt formation reactions, and the hydroxyl group is not functional.

Aforementioned U. S. Patent No. 2,324,488 describes hydroxylated acylated amino-ether compounds containing:

(a) A radical derived from a basic hydroxy-amino-ether, and said radical being of the kind containing at least one amino nitrogen free from attached aryl and amido-linked acyl radicals; said hydroxyamino-ether radical being further characterized by the presence of at least one radical derived from a basic hydroxyamine and being attached by at least one ether linkage to at least one radical selected from the class consisting of glycerol radicals, polyglycerol radicals, glycol radicals, polyglycol radicals, basic hydroxyamine radicals, amido hydroxyamine radicals, and aryl alkanolamine radicals; said basic hydroxyamino-ether radical being characterized by containing not more than 60 carbon atoms; and (b) An acyl radical derived from a detergent-forming monocarboxy acid having at least 8 carbon atoms and not more than 32 carbon atoms, said acylated amino-ether being additionally characterized by the fact that said aforementioned acyl radical is a substituent for a hydrogen atom of an alcoholic hydroxyl radical.

Aforementioned U. S. Patent No. 2,324,489 describes hydroxylated acylated monoamino compounds free from ether linkages, said hydroxylated acylated amino compounds being of the following type:

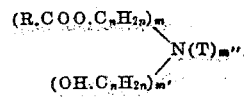

in which R.COO represents the oxyacyl radical derived from a monobasic detergent-forming acid; T represents a member of the class consisting of hydrogen atom, non-hydroxy hydrocarbon radicals, and acylated radicals, obtained by replacing a hydrogen atom of the hydroxyl group of an alkylol radical by the acyl radical of a monobasic carboxy acid having less than 8 carbon atoms; $n$ represents a small whole number which is less than 10; $m$ represents the numeral 1, 2 or 3; $m'$ represents the numeral 0, 1 or 2; and $m''$ represents the numeral 0, 1, or 2; with the proviso that $m$ plus $m'$ plus $m''$ equal 3. This type of reactant is limited in the instant situation to the tertiary amine compounds.

Aforementioned U. S. Patent No. 2,324,490 describes basic hydroxylated acylated polyamino compounds free from ether linkages, said compounds being of the following formula:

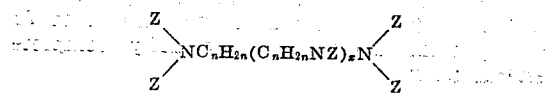

in which $n$ represents a small whole number varying from 2 to 10; $x$ is a small whole number varying from 0 to 10; Z is a member of the class consisting of H, RCO, R'CO, and D, in which RCO represents an acyl radical derived from a detergent-forming monocarboxy acid; R'CO is an acyl radical derived from a lower-molecular-weight carboxy acid having 6 carbon atoms or less; and D is a member of the class consisting of alkyl, hydroxyalkyl, aminoalkyl, and acyloxyalkylene, in which instance the acyl group is a member of the class consisting of RCO and R'CO; and the acylated polyamine is further characterized by the fact that there must be present a member of the class consisting of (a) Acyloxyalkylene radical, in which the acyl group is RCO; and (b) Joint occurrence of an amino radical, in which the acyl group is RCO and a hydroxyalkyl radical.

A description of certain high molal monocarboxy acids, and more particularly, those commonly referred to as detergent-forming monocarboxy acids, appears in all three of the aforementioned U. S. patents. For convenience, the following description is substantially a verbatim form of the same subject-matter as it appears in U. S. Patent No. 2,324,490.

It is well known that certain monocarboxy organic acids containing eight carbon atoms or more, and not more than 32 carbon atoms, are characterized by the fact that they combine with alkalis to produce soap or soap-like materials. These detergent-forming acids include fatty acids, resin acids, petroleum acids, etc. For the sake of convenience, these acids will be indicated by the formula R.COOH. Certain derivatives of detergent-forming acids react with alkali to produce soap or soap-like materials, and are the obvious equivalent of the unchanged or unmodified detergent-forming acids. For instance, instead of fatty acids, one might employ the chlorinated fatty acids. Instead of the resin acids, one might employ the hydrogenated resin acids. Instead of naphthenic acids, one might employ brominated naphthenic acids, etc.

The fatty acids are of the type commonly referred to as higher fatty acids; and of course, this is also true in regard to derivatives of the kind indicated, insofar that such derivatives are obtained from higher fatty acids. The petroleum acids include not only naturally-occurring naphthenic acids, but also acids obtained by the oxidation of wax, paraffin, etc. Such acids may have as many as 32 carbon atoms. For instance, see U. S. Patent No. 2,242,837, dated May 20, 1941, to Shields.

We have found that the composition of matter herein described and employed as the break inducer of our process is preferably derived from unsaturated fatty acids having 18 carbon atoms. Such unsaturated fatty acids include oleic acid, ricinoleic acid, linoleic acid, linolenic acid, etc. One may employ mixed fatty acids, as, for example, the fatty acids obtained from hydrolysis of cottonseed oil, soyabean oil, etc. Our preferred break inducer is obtained from unsaturated fatty acids, and more especially, unsaturated fatty acids containing a hydroxyl radical, or unsaturated fatty acids which have been subjected to oxidation. In addition to synthetic carboxy acids obtained by the oxidation of paraffins or the like, there is the somewhat analogous class obtained by treating carbon dioxide or carbon monoxide, in the presence of hydrogen or an oléfine, with steam, or by causing a halogenated hydrocarbon to react with potassium cyanide and saponifying the product obtained. Such products or mixtures thereof, having at least 8 and not more than 32 carbon atoms and having at least one carboxyl group or the equivalent thereof, are suitable as detergent-forming monocarboxy acids; and another analogous class equally suitable is the mixture of carboxylic acids obtained by the alkali treatment of alcohols of high molecular weight formed in the catalytic hydrogenation of carbon monoxide.

As is well known, one need not use the high molal carboxy acid, such as a fatty acid, for introduction of the acyl group or acyloxy group. Any suitable functional equivalent such as the acyl halide, the anhydride, ester, amide, etc., may be employed.

Attention is directed to the fact that the acylated aminoalcohols herein employed are obtained exclusively from hydroxylated tertiary amines and do not include examples in which primary or secondary amines are employed. Suitable tertiary amines which may be employed include the following: Triethanolamine, diethanolalkylamines, such as diethanolethylamine, diethanolpropylamine, etc. Other examples include diethanolmethylamine, tripropanolamine, dipropanolmethylamine, cyclohexanoldiethanolamine, dicyclohexanolethanolamine, cyclohexyldiethanolamine, dicyclohexylethanolamine, dicyclohexanolethylamine, benzyldiethanolamine, benzyldipropanolamine, tripentanolamine, trihexanolamine, octadecyldiethanolamine, etc.

Additional amines include ethanoldiethylamine, propanoldiethylamine, ethanoldipropylamine, propanoldipropylamine, ethanoldicyclohexylamine, cyclohexanoldiethylamine, dibenzylethanolamine, etc. Ether type amino-alcohols may be obtained from the above-mentioned amino-alcohols, for example, by treating them with one or more moles of an oxyalkylating agent, such as ethylene oxide, propylene oxide, butylene oxide, glycide, etc. It is to be noted that comparable products are obtained by treating primary or secondary amines other than arylamines with an olefine oxide.

For practical purposes, the cheapest and the most satisfactory tertiary amine is triethanolamine, and to a lesser extent tripropanolamine, in light of the fact that the latter is somewhat more expensive. The preferred monocarboxy acids are higher fatty acids, and preferably, unsaturated higher fatty acids. Our preference is to use fatty acids having 12 to 18 carbon atoms, and particularly those having the last mentioned number of carbon atoms. We have found that ricinoleic acid is particularly desirable. It is obvious that the preferred monocarboxy acids, to wit, the unsaturated higher fatty acids, are most readily available in the form of the naturally-occurring glyceride, as, for example, castor oil, soyabean oil, sunflower seed oil, rapeseed oil, etc. The reaction involving such glyceride and the selected hydroxylated tertiary amine, such as triethanolamine, is often conducted most conveniently at a point approximating the pyrolytic point of the glyceride, such as triricinolein. This means, for example, a temperature as high as 240° to 250° C. Under such conditions not only does the triethanolamine, for example, if used as a reactant etherize, but the glycerol that is split may also etherize, and undoubtedly, does to a very large extent. As a result, if one follows the usual type of reaction, using, for example, one mole of triricinolein and 1, 2, 3 or 4 moles of triethanolamine per ricinoleyl radical (3 to 12 moles of triethanolamine per mole of triricinolein), the result is, that one obtains the acylated product which is a monoamine or a polyamine, depending upon the proportion of reactants employed. Furthermore, the glycerol which is split off will also etherize.

Our preference is to use triethanolamine along with an unsaturated 18 carbon atom fatty acid glyceride, preferably castor oil, but which may be soyabean oil, linseed oil, sunflower seed oil, etc.

The products so obtained have been described in the patent literature but correspond, in essence, to the following:

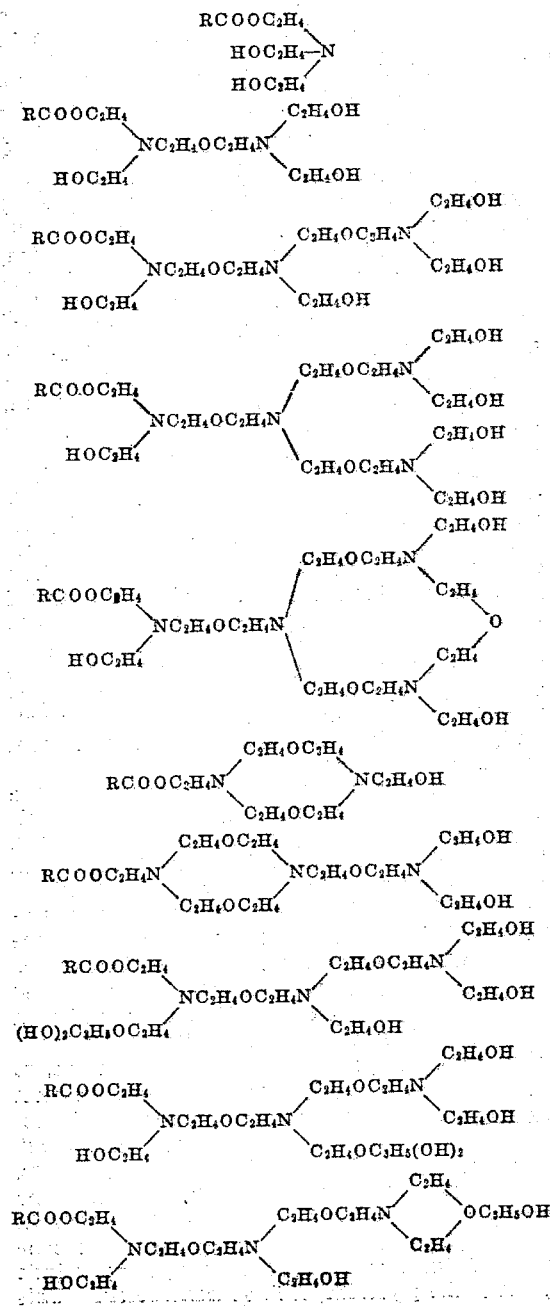

Example 1d 1 pound mole of ricinoleic acid is reacted with 1 pound mole of triethanolamine at approximately 180° to 240° C. for approximately 10 to 25 hours, until there is substantially complete esterification.

Example 2d

Ricinoleic acid in the preceding example is replaced by methyl naphthenate.

Example 3d

Methyl abietate is substituted for ricinoleic acid in Example 1d, preceding.

Example 4d

Ethyl oleate is substituted for ricinoleic acid in Example 1d, preceding.

Example 5d 1 pound mole of triethanolamine is reacted with 1 pound mole of ethylene oxide and the etherized amine so obtained is substituted for triethanolamine in Examples 1d to 4d, preceding.

Example 6d 1 pound mole of triethanolamine is reacted with 2 pound moles of ethylene oxide and the etherized amine so obtained is substituted for triethanolamine in Examples 1d to 4d, preceding.

Example 7d 1 pound mole of triethanolamine is reacted with 3 pound moles of ethylene oxide and the etherized amine so obtained is substituted for triethanolamine in Examples 1d to 4d, preceding.

Example 8d 1 pound mole of triethanolamine is reacted with 4 to 6 pound moles of ethylene oxide and the etherized amine so obtained is substituted for triethanolamine in Examples 1d to 4d, preceding.

Example 9d 1 pound mole of ethanol diamylamine obtained by reacting 1 pound mole of diamylamine with 1 pound mole of ethylene oxide is employed in place of triethanolamine in Examples 1d to 4d, preceding.

Example 10d

The same procedure is employed as in the preceding example, except that an etherized amine is obtained by treating diamylamine with 2, 3 or 4 moles of ethylene oxide and such etherized amine is employed instead of ethanol diamylamine.

Example 11d 1 pound mole of castor oil is reacted with 3 pound moles of triethanolamine, as described in the aforementioned U. S. Patent No. 2,324,489, under the heading "Intermediate Hydroxylated Amine, Example 1."

Example 12d

The same procedure is followed as in the preceding example, except that either 1 pound mole or 2 pound moles of glycerol are added to the reaction mass consisting of 1 pound mole of castor oil and 3 pound moles of triethanolamine.

Example 13d

The products obtained in Examples 1d to 4d, preceding, are treated with equal molal ratios of an olefine oxide.

Example 14d

One follows the directions of U. S. Patent No. 2,293,494, to De Groote and Keiser, dated August 18, 1942, to produce an amine of the following composition:

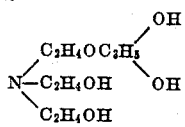

Such amine is substituted for triethanolamine in the preceding examples.

Example 15d 1 pound mole of hydroxyethyl ethylenediamine is reacted with 4 moles of ethylene oxide to give the corresponding tetrahydroxylated derivative. Such compound is employed in place of triethanolamine in the preceding examples.

Example 16d

The same procedure is followed as in the preceding example, except that 5 to 8 moles of ethylene oxide are employed instead of 4 moles.

Example 17d

The same procedure is employed as in the preceding example, except that diethylenetriamine is substituted for ethylenediamine.

Example 18d

Amines of the following composition:

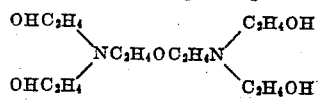
and
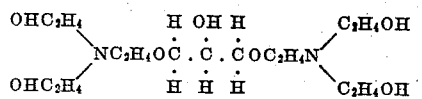

are substituted for ethylenediamine in the preceding examples.

Example 19d

In the preceding examples, where more than 1 high molal acyl radical can be employed, 2 ricinoleyl radicals or the equivalent are introduced into the polyamino alcohol.

Example 20d

Unsymmetrical diphenyl diethylenetriamine is treated with ethylene oxide and substituted for oxyethylated ethylenediamine in the preceding examples.

Example 21d

Symmetrical diacetyl triethylenetetramine is treated with 4 moles of ethylene oxide and substituted for oxyethylated ethylenediamine in the preceding examples.

Example 22d

Additional examples are prepared in the manner previously described, except that one employs aminoalcohols obtained by the oxyalkylation of morpholine; 1,3-diamino-2-propanol; 2-amino-1-butanol; 2-amino-2-methyl-1-propanol; 2-amino-2-methyl-1,3-propanediol; 2-amino-2-ethyl-1,3-propanediol; tris-(hydroxymethyl)aminomethane; or piperidine. One may use enough of the olefine oxide, for instance, ethylene oxide, to convert all amino hydrogen atoms into hydroxyethyl radicals, or one may employ a greater amount so as to introduce ether linkages in addition.

Example 23d

The same procedure is followed as in Example 22d, preceding, except that one employs the amines described in Examples 9, 10, 11 and 13 of United States Patent 2,306,329, to De Groote and Keiser, dated December 22, 1942.

Example 24d

Soyabean oil, blown soyabean oil, blown castor oil, or blown teaseed oil is substituted for castor oil in the preceding examples.

In the above examples it is obvious that free hydroxyl radicals may be present as part of a hydroxyalkyl radical, or as part of the acyl radical or a fatty acid such as ricinoleic acid.

As an example of a particularly preferred type of reagent which is effective for use in our process, the following is submitted: We prepare a mixture of diamino and triamino materials which correspond essentially to either one of the two following type formulae:

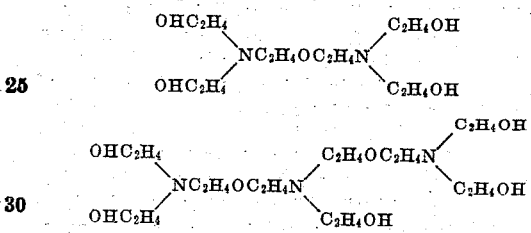

After determining the average molecular weight of such mixture, we combine the same with castor oil in the proportion of 1 pound mole of castor oil for 3 pound moles of the mixed amines, "pound mole" in the latter case being calculated on the average molecular weight as determined. Such mixture is heated to approximately 160–260° C. for approximately 6 to 25 hours, until reaction is complete, as indicated by the disappearance of all of the triricinolein present in the castor oil. The finished product may be used as such, but because of its appreciable viscosity, it may be desirable to mix it with any desired proportion of water or other solvent. We have found, for example, that a mixture of 20 parts of the above reagent and 80 parts of water has physical properties, which are in some respects superior to those of the concentrated material.

In summary, attention is directed to the fact that the amino compounds herein contemplated may be monoamino or polyamino in type. They may or may not have a free hydroxyl radical present. There must be present at least one occurrence of the radical:

$$RCO.(R'O)_{n'}N<$$

in which RCO is the acyl radical of a monocarboxy detergent-forming acid having at least 8 and not more than 32 carbon atoms, and the amino nitrogen atom must be basic, i. e., free from direct linkage with an unsaturated or negative radical such as an acyl radical or an aryl radical. The R' is an alkylene radical having at least two and not more than 10 carbon atoms, and preferably 2, 3 or 4 carbon atoms. The alkylene radical may be considered as being derived from an olefine oxide, such as those previously mentioned. Additional reactive olefine oxides are described in U. S. Patent No. 2,208,581, to Hoeffelman, dated July 23, 1940, and include among others, glycide hexylene oxide, decene oxide, etc. The character $n'$ indicates a number varying from 1 to 10, but preferably from 1 to 4. Recurrence of R' need not be the same. For instance, 1 mole of triethanolamine might be reacted with 3 moles of ethylene oxide, and the resultant product so obtained may be reacted with 3 moles of butylene oxide. The amino-alcohol so obtained could be esterified in the manner previously described. It is obvious, of course, that where $n$ is 2 or more, the product is, in essence, an esterified aminoetheralcohol, the expression etheralcohol being frequently applied to alcohols, where a carbon atom chain is interrupted at least once by an oxygen atom. Ether linkages may appear in other positions, where there is no direct union with RCO.

For a more complete description of the amine reactants, see U. S. Patent No. 2,366,545, dated January 2, 1945, to Morris. Broadly speaking, the description therein employed to describe the reactants is the following: "a basic acylated aminoalcohol in which there is at least one occurrence of the radical

in which RCO is the acyl radical of a monocarboxy detergent-forming acid having at least 8 and not more than 32 carbon atoms; the amino nitrogen atom is basic; R' is an alkylene radical having at least 2 and not more than 10 carbon atoms; and $n'$ is a small whole number varying from 1 to 10; and the molecular weight of said compound in monomeric form being at least 213 and not over 4,000;". The reactant of the lowest molecular weight is obtained from dimethyl ethanolamine and octenoic acid.

Previously, a wide variety of esterified aminoalcohols have been described under the heading of Example 1d, et seq. Two distinct classes of esterified aminoalcohols are available commercially—mono-amino and polyamino. In most cases such esters are preferably obtained from unsaturated fatty acids or higher glycerides, due to the more attractive physical property of the final derivative. The following examples exemplify preparation of quaternary compounds from two different castor oil derivatives, the first in which castor oil is reacted with approximately 3 or 3.3 moles of commercial triethanolamine, and the second one in which castor oil is reacted with approximately 8 moles of triethanolamine.

*Example 1e*

400 grams of the xylene-containing alpha-chloro acid ester identified as 13c of Patent 2,542,002 were mixed with an equimolar amount, to wit, 138 grams of an aminoalcohol ester (a tertiary amine) obtained by reacting one mole of triricinolein (castor oil) with 3.3 moles of commercial triethanolamine. Specifically, in the manufacture of the aminoalcohol ester the ratio employed was 932 pounds of castor oil and 466 pounds of triethanolamine. The mixture was heated for 4 hours at 250° C.

To the ester-tertiary amine mixture, there was added an amount of xylene equal in weight to about 25% of the tertiary amine. In the instant case this was 35 grams. A little xylene was lost during the subsequent reflux period. The experiments were conducted so that in the majority of cases the final product contained approximately 40% xylene. If desired, this xylene could be eliminated by evaporation, or vacuum distillation. In the use of the products for demulsification it is convenient to have the xylene present so as to give a non-viscous liquid which can be handled easily.

The two reactants were refluxed at the boiling point of xylene (approximately 140° C.) for 2 to 4 hours. Tests in this kind of reaction have invariably indicated that the reaction was complete in less than 2 hours and sometimes in as little as 30 minutes. However, by way of precaution in this experiment, and in succeeding experiments, such time range of 2 to 4 hours was employed. The final product, without eliminating the xylene, was a deep amber color and readily water-emulsifiable. The product, after the reaction was completed, contained 41% xylene.

*Example 2e*

The procedure employed was the same as that in Example 1e, except that 400 grams of the ester identified as 8c of Patent 2,542,002 were reacted with 139 grams of the tertiary amine previously described specifically under the heading of Example 1e. The product contained 38.5% xylene. This was a viscous, deep-amber-colored water-soluble liquid.

*Example 3e*

The procedure employed was the same as that in Example 1e, except that 400 grams of the ester identified as 2c of Patent 2,542,002 were reacted with 189 grams of the tertiary amine previously described specifically under the heading of Example 1e. The product contained 43.7% xylene, and was a somewhat viscous, deep amber-colored water-soluble liquid.

*Example 4e*

The procedure employed was the same as that in Example 1e, except that 400 grams of the ester identified as 12c of Patent 2,542,002 were reacted with 157 grams of the tertiary amine previously described specifically under the heading of Example 1e. The product contained 44.7% xylene, and was a viscous, deep amber-colored water-soluble liquid.

*Example 5e*

The procedure employed was the same as that in Example 1e, except that 400 grams of the ester identified as 18c of Patent 2,542,002 were reacted with 140 grams of the tertiary amine previously described specifically under the heading of Example 1e. The product contained 37.6% xylene, and was a viscous, deep-amber-colored water-soluble liquid.

*Example 6e*

The procedure employed was the same as that in Example 1e, except that 400 grams of the ester identified as 4c of Patent 2,542,002 were reacted with 129 grams of the tertiary amine previously described specifically under the heading of Example 1e. The product contained 35.4% xylene, and was a viscous deep amber-colored water-soluble liquid.

*Example 7e*

The procedure employed was the same as that in Example 1e, except that 400 grams of the ester identified as 5c of Patent 2,542,002 were reacted with 108 grams of the tertiary amine previously described specifically under the heading of Example 1e. The product contained 36.2% xylene and was a viscous, deep amber-colored water-soluble liquid.

*Example 8e*

The same procedure was followed as in Example 1e, except that the tertiary amine employed was an aminoalcohol obtained by reacting one mole of triricinolein with 8 moles of commercial triethanolamine. Specifically, in the manufacture of this particular amino alcohol ester, there were employed 932 pounds of castor oil and 1200 pounds of triethanolamine. The mixture was heated for 4 hours at 250° C. The specific reactant mixture was 400 grams of the ester described as 24c and 135 grams of the tertiary amine reactant described immediately preceding. As previously noted, the entire procedure was identical with that described under Example 1e. The resultant product contained 34% xylene. It was a viscous, deep amber-colored liquid which was water-soluble.

*Example 9e*

The procedure employed was the same as that in Example 1e, except that 400 grams of the ester identified as 10c of Patent 2,542,002 were reacted with 114 grams of the tertiary amine previously described specifically under the heading of Example 1e. The product contained 37.2% xylene and was a non-viscous, deep amber-colored water-soluble liquid.

*Example 10e*

The procedure employed was the same as that in Example 1e, except that 400 grams of the ester identified as 14c of Patent 2,542,002 were reacted with 144 grams of the tertiary amine previously described specifically under the heading of Example 1e. The product contained 38.2% xylene and was a non-viscous, deep amber-colored water-soluble liquid.

*Example 11e*

The procedure employed was the same as that in Example 1e, except that 400 grams of the ester identified as 9c of Patent 2,542,002 were reacted with 143 grams of the tertiary amine previously described specifically under the heading of Example 1e. The product contained 37% xylene and was a non-viscous, deep amber-colored water-soluble liquid.

*Example 12e*

The procedure employed was the same as that in Example 1e, except that 400 grams of the ester identified as 19c of Patent 2,542,002 were reacted with 145 grams of the tertiary amine previously described specifically under the heading of Example 1e. The product contained 36% xylene and was a non-viscous, deep amber-colored water-soluble liquid.

*Example 13e*

The procedure employed was the same as that in Example 1e, except that 400 grams of the ester identified as 20c of Patent 2,542,002 were reacted with 120 grams of the tertiary amine previously described specifically under the heading of Example 1e. The product contained 36.4% xylene and was a non-viscous, deep amber-colored water-soluble liquid.

*Example 14e*

The procedure employed was the same as that in Example 1e, except that 400 grams of the ester identified as 3c of Patent 2,542,002 were reacted with 151 grams of the tertiary amine previously described specifically under the heading of Example 1e. The product contained 36% xylene and was a non-viscous, deep amber-colored water-soluble liquid.

*Example 15e*

The procedure employed was the same as that in Example 1e, except that 400 grams of the ester identified as 23c of Patent 2,542,002 were reacted with 206 grams of the tertiary amine previously described specifically under the heading of Example 1e. The product contained 30.4% xylene and was a non-viscous, deep amber-colored water-soluble liquid.

*Example 16e*

The procedure employed was the same as that in Example 1e, except that 400 grams of the ester identified as 25c of Patent 2,542,002 were reacted with 133 grams of the tertiary amine previously described specifically under the heading of Example 1e. The product contained 33.4% xylene and was a non-viscous, deep amber-colored water-soluble liquid.

Having thus described our invention, what we claim and desire to secure by Letters Patent is:

1. A quaternary ammonium compound obtained by reaction between a basic acylated aminoalcohol, in which there is at least one occurrence of the radical $$RCO.(OR')_{n'}N<$$

in which RCO is the acyl radical of a monocarboxy detergent-forming acid having at least 8 and not more than 32 carbon atoms; the amino nitrogen atom is tertiary and basic; R' is an alkylene radical having at least 2 and not more than 10 carbon atoms; and $n$ is a small whole number varying from 1 to 10; and the molecular weight of said compound in monomeric form being at least 213 and not over 4,000; and an ester in which the acyl radical is that of an alpha-halogen monocarboxylic acid having not over 6 carbon atoms and composed of carbon, hydrogen, oxygen and halogen and the alcoholic radical is that of certain hydrophile polyhydric synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide; and (B) an oxyalkylation-susceptible, fusible, organic solvent-soluble, water-insoluble, phenol-aldehyde resin; said resin being derived by reaction between a difunctional monohydric phenol and an aldehyde having not over 8 carbon atoms and having one functional group reactive towards said phenol; said resin being formed in the substantial absence of phenols of functionality greater than two; said phenol being of the formula:

in which R is a hydrocarbon radical having at least 4 and not more than 12 carbon atoms and substituted in one of the positions ortho and para; said oxyalkylated resin being characterized by the introduction into the resin molecule at the phenolic hydroxyls of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

2. A quaternary ammonium compound obtained by reaction between a basic acylated aminoalcohol, in which there is at least one occurrence of the radical RCO.(OR')$_n$'N< in which RCO is the acyl radical of a monocarboxy detergent-forming acid having at least 8 and not more than 32 carbon atoms; the amino nitrogen atom is tertiary and basic; R' is an alkylene radical having at least 2 and not more than 10 carbon atoms; and $n$ is a small whole number varying from 1 to 10; and the molecular weight of said compound in monomeric form being at least 213 and not over 4,000; and a chloroacetate of certain hydrophile polyhydric synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide; and (B) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and having one functional group reactive towards said phenol; said resin being formed in the substantial absence of phenols of functionality greater than two; said phenol being of the formula:

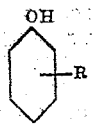

in which R is a hydrocarbon radical having at least 4 and not more than 12 carbon atoms and substituted in one of the positions ortho and para; said oxyalkylated resin being characterized by the introduction into the resin molecule at the phenolic hydroxyls of a plurality of divalent radicals having the formula (R$_1$O)$_n$, in which R$_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus; and with the final proviso that the hydrophile properties of the ultimate quaternary ammonium compound as well as the oxyalkylated resin in an equal weight of xylene are sufficient to produce an emulsion when said xylene solution is shaken vigorously with one to three volumes of water.

3. A quaternary ammonium compound obtained by reaction between a basic acylated aminoalcohol in which there is at least one occurrence of the radical RCO.(OR')$_n$'N< in which RCO is the acyl radical of a monocarboxy detergent-forming acid having at least 8 and not more than 32 carbon atoms; the amino nitrogen atom is tertiary and basic; R' is an alkylene radical having at least 2 and not more than 10 carbon atoms; and $n$ is a small whole number varying from 1 to 10; and the molecular weight of said compound in monomeric form being at least 213 and not over 4,000; and a chloroacetate of certain hydrophile polyhydric synthetic products; said hydrophile synthetic products being oxyethylation products of (A) ethylene oxide, and (B) an oxyethylation-susceptible, fusible, organic solvent-soluble, water-insoluble phenol-aldehyde resin; said resin being derived by reaction between a difunctional monohydric phenol and an aldehyde having not over 8 carbon atoms and having one functional group reactive towards said phenol; said resin being formed in the substantial absence of phenols of functionality greater than two; said phenol being of the formula:

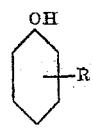

in which R is a hydrocarbon radical having at least 4 and not more than 12 carbon atoms and substituted in one of the positions ortho and para; said oxyethylated resin being characterized by the introduction into the resin molecule at the phenolic hydroxyls of a plurality of divalent radicals having the formula (C$_2$H$_4$O)$_n$; wherein $n$ is a numeral varying from 1 to 20; with the proviso that at least 2 moles of ethylene oxide be introduced for each phenolic nucleus; and with the final proviso that the hydrophile properties of the ultimate quaternary ammonium compound as well as the oxyethylated resin in an equal weight of xylene are sufficient to produce an emulsion when said xylene solution is shaken vigorously with one to three volumes of water.

4. A quaternary ammonium compound obtained by reaction between a basic acylated aminoalcohol in which there is at least one occurrence of the radical RCO.(OR')$_n$'N< in which RCO is the acyl radical of a monocarboxy detergent-forming acid having at least 8 and not more than 32 carbon atoms; the amino nitrogen atom is tertiary and basic; R' is an alkylene radical having at least 2 and not more than 10 carbon atoms; and $n$ is a small whole number varying from 1 to 10; and the molecular weight of said compound in monomeric form being at least 213 and not over 4,000; and a chloroacetate of certain hydrophile polyhydric synthetic products; said hydrophile synthetic products being oxyethylation products of (A) ethylene oxide, and (B) an oxyethylation-susceptible, fusible, organic solvent-soluble, water-insoluble, low-stage phenol-aldehyde resin having an average molecular weight corresponding to at least 3 and not over .7 phenolic nuclei per resin molecule; said resin being derived by reaction between a difunctional monohydric phenol and formaldehyde; said resin being formed in the substantial absence of phenols of functionality greater than two; said phenol being of the formula:

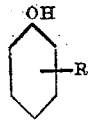

in which R is an aliphatic hydrocarbon radical having at least 4 and not more than 12 carbon atoms and substituted in one of the positions ortho and para; said oxyethylated resin being characterized by the introduction into the resin molecule at the phenolic hydroxyls of a plurality of divalent radicals having the formula (C$_2$H$_4$O)$_n$; wherein $n$ is a numeral varying from 1 to 20; with the proviso that at least 2 moles of ethylene oxide be introduced for each phenolic nucleus; and with the final proviso that the hydrophile properties of the ultimate quaternary ammonium compound as well as the oxyethylated resin in an equal weight of xylene are sufficient to produce an emulsion when said xylene solution is shaken vigorously with one to three volumes of water.

5. The product of claim 4, wherein R is substituted in the para position.

6. The product of claim 4, wherein R is a butyl radical substituted in the para position.

7. The product of claim 4, wherein R is an amyl radical substituted in the para position.

8. The product of claim 4, wherein R is a nonyl radical substituted in the para position.

MELVIN DE GROOTE.
BERNHARD KEISER.

REFERENCES CITED

The following references are of record in the file of this patent:

UNITED STATES PATENTS

| Number | Name | Date |
| --- | --- | --- |
| 2,499,365 | De Groote | Mar. 7, 1950 |